United States Patent
Nykyforuk

[19]
[11] Patent Number: 5,972,061
[45] Date of Patent: Oct. 26, 1999

[54] WELLHEAD SEPARATION SYSTEM

[76] Inventor: Craig Nykyforuk, 34 Depalme Street, Red Deer, Alberta, Canada, T4R 2G4

[21] Appl. No.: 09/056,713

[22] Filed: Apr. 8, 1998

[51] Int. Cl.⁶ .......................... B01D 45/08; B01D 45/12
[52] U.S. Cl. .......................... 55/423; 55/426; 55/434.2; 55/449; 55/459.1; 55/465
[58] Field of Search .......................... 55/423, 421, 424, 55/426, 462, 465, 434.1, 434.2, 448, 449, 450, 451, 454, 460, 459.1, 392.1, 392, 394, 397, 395

[56] References Cited

U.S. PATENT DOCUMENTS

| | | |
|---|---|---|
| 393,543 | 11/1888 | Curtis . |
| 482,354 | 9/1892 | Goubert ..................... 55/424 |
| 815,407 | 3/1906 | Cooper . |
| 1,600,762 | 9/1926 | Hawley ..................... 55/392 |
| 1,680,255 | 8/1928 | Poston ..................... 55/465 |
| 1,727,733 | 9/1929 | Stovall . |
| 1,917,606 | 7/1933 | Sillers . |
| 1,926,262 | 9/1933 | Campbell . |
| 2,157,829 | 5/1939 | Metzgar ..................... 55/465 |
| 2,582,250 | 1/1952 | Hershberg et al. ..................... 55/434.1 |
| 2,887,174 | 5/1959 | Ray . |
| 3,008,538 | 11/1961 | Glasgow . |
| 3,822,533 | 7/1974 | Oranje ..................... 55/394 |
| 3,877,904 | 4/1975 | Lowrie ..................... 55/392 |
| 4,036,615 | 7/1977 | Heintzelman ..................... 55/462 |
| 4,221,577 | 9/1980 | Lowrie ..................... 55/426 |
| 4,263,025 | 4/1981 | Godare ..................... 55/185 |
| 4,483,697 | 11/1984 | Deysson et al. ..................... 55/205 |
| 4,579,565 | 4/1986 | Heath ..................... 55/20 |
| 4,617,030 | 10/1986 | Heath ..................... 55/20 |
| 4,737,168 | 4/1988 | Heath ..................... 55/45 |
| 4,982,794 | 1/1991 | Houot ..................... 166/357 |
| 5,108,472 | 4/1992 | Murray, Sr. ..................... 55/219 |
| 5,482,117 | 1/1996 | Kolpak et al. ..................... 166/265 |
| 5,570,744 | 11/1996 | Weingarten et al. ..................... 166/357 |

FOREIGN PATENT DOCUMENTS

52275  10/1975  Japan .

*Primary Examiner*—Duane S. Smith
*Attorney, Agent, or Firm*—Thomas E. Malyszko

[57] ABSTRACT

A compact system is provided for removing liquid from a gas stream exiting a natural gas wellhead. The system has an inlet pipe string communicating with the wellhead for delivering the gas stream therefrom. An elongate, generally cylindrical gas-liquid separator has an inlet communicating with the inlet pipe string for receiving the gas stream therein. The separator separates the liquid from the gas stream to provide a dried gas stream and temporarily stores a pre-set volume of the liquid. The separator includes a disengaging chamber in fluid communication with the inlet for changing the velocity of the incoming gas stream, and at least one baffle element in the disengaging chamber for engaging the gas stream to urge the liquid to coalesce thereon and fall by gravity toward one end of the separator. A separator outlet releases the dried gas stream to an outlet pipe string for transporting the dried gas stream to a gas distribution network. An insulated enclosure houses the separator and at least a portion of the inlet and outlet pipe strings. The enclosure is elevated above a ground surface and is fully supported on the inlet and outlet pipe strings. An opening in the enclosure permits the liquid to exit the separator and enclosure for disbursement on the ground or collection elsewhere.

30 Claims, 5 Drawing Sheets

FRONT VIEW
FIG. 1

WELLHEAD SEPARATION SYSTEM

FIELD OF THE INVENTION

The present invention relates to a system and apparatus for separating liquid from gas down stream of a gas wellhead.

BACKGROUND OF THE INVENTION

When a gas well produces natural gas, the gas typically carries liquid, namely water which may also contain particulate matter such as mud and sediment and other substances. This water must be removed from the gas stream before it enters a pipeline system because the water could impede the flow of gas. Water in the presence of gas forms hydrates or ice which can block the flow of gas, particularly in cold climates. Such blockage can create a safety problem in operating the well or pipeline system.

Traditionally well operators have installed separator packages which use a separator that is a minimum of about 12 inches (aprox. 0.3 m) in diameter and 5 feet (aprox. 1.5 m) tall. These prior art separators are very large, bulky and heavy, and are housed in buildings for access by maintenance personnel. The separators are also expensive, with units generally ranging in cost between ten and twenty thousand dollars (CAD), for instance. For shallow gas wells, this cost to separate water makes the wells uneconomic to operate, and so the wells are often abandoned.

What is desired therefore is a novel system and apparatus which overcomes the limitations and problems of prior art separators. Preferably it should provide a fairly simple and compact system with a minimum of moving parts for efficiently and automatically removing liquid from a gas stream. The system should be fully self contained and be light weight to avoid special supports for mounting on a gas pipeline or adjacent a wellhead, and should be relatively inexpensive for economical production of shallow gas wells and the like, particularly in cold climates.

SUMMARY OF THE INVENTION

Conventional separator theory is that the efficiency of separation between liquid and gas is based on the disengaging area. Though this may be true, this theory becomes uneconomic for wells at lower flow rates. Efficiency of separation may also be effected by a change in direction or change in velocity of the gas/liquid mixture. The separator of the present system is based on the view that for lower flow rates of gas, effective separation should be achieved by combining a change in direction and velocity of the gas/liquid mixture, and optionally adding a rotational or centrifugal force, to provide a more efficient, compact and less expensive design than prior art separators and separation systems.

In one aspect the invention provides a compact system for removing liquid from a gas stream exiting a natural gas wellhead, said system comprising:

an inlet pipe string communicating with said wellhead for delivering said gas stream therefrom;

an elongate, generally cylindrical gas-liquid separator having an inlet communicating with said inlet pipe string for receiving said gas stream therein, said separator being adapted to separate said liquid from said gas stream to provide a dried gas stream and to store a pre-set volume of said liquid therein, and an outlet for releasing said gas stream;

an outlet pipe string communicating with said outlet of the separator for transporting said dried gas stream away from said separator; and, an enclosure for housing said separator and at least a portion of said inlet and outlet pipe strings, said enclosure being elevated above a ground surface and supported on said inlet and outlet pipe strings, and having an opening therein for permitting said liquid to exit said separator and enclosure.

In another aspect the invention provides an apparatus for separating liquid from a gas stream to provide a dried gas stream for a natural gas pipeline wherein an inlet pipe string communicates with a natural gas well for transporting said gas stream therefrom, said apparatus comprising:

an elongate, generally cylindrical body having an inlet communicating with said inlet pipe string for receiving said gas stream therein, a disengaging chamber in fluid communication with said inlet for changing the velocity of said gas stream, at least one baffle element in said disengaging chamber for engaging said gas stream to urge said liquid to coalesce thereon and fall by gravity toward one end of the body to provide said dried gas stream, an outlet in communication with said disengaging chamber for releasing said dried gas stream from said body to said natural gas pipeline.

DESCRIPTION OF THE DRAWINGS

Embodiments of the invention will now be described, by way of example only, with reference to the accompanying drawings, wherein.

LIST OF REFERENCE NUMBERS IN DRAWINGS

20 separation system
21 ground surface
22 inlet pipe of 20
24 gas entry (arrow) into 22
26 outlet pipeline
28 dump valve
30 meter run
32 chart recorder
34 exit of 20
36 enclosure of 20

37 opening in 36
38 gas line
39 liquid outlet through 37
40 fuel gas dryer
41 conduit between 40 and 42
42 heater unit for 36
50 separator (first embodiment)
52 inlet
53 outlet
54 disengaging chamber of 50
56 impingement baffle of 50
58 dome portion of 50
60 bottom of 50
62 down comer of 50
64 horizontal portion of 62
65 gap between 64 and separator wall
66 vertical portion of 62
67 lower edge of 66
68 holding compartment of 50
70 level switch for 68
72 float flange of 50
74 fluid exit port of 68
80 separator (second embodiment)
81 wall of 80
82 dome portion of 80
84 lower body portion of 80
86 funnel chamber of 82
87 middle portion of 86
88 terminal end of 86
90 disengaging chamber of 84
92 acceleration chamber of 82
93 mouth of 92
94 ribs in 90
96 down comer of 84
97 top portion of 96
98 side portion of 96
99 shelf for 96
100 sump of 84
102 float flange of 84
104 fluid exit port of 100

DESCRIPTION OF PREFERRED EMBODIMENTS

Figure 1:
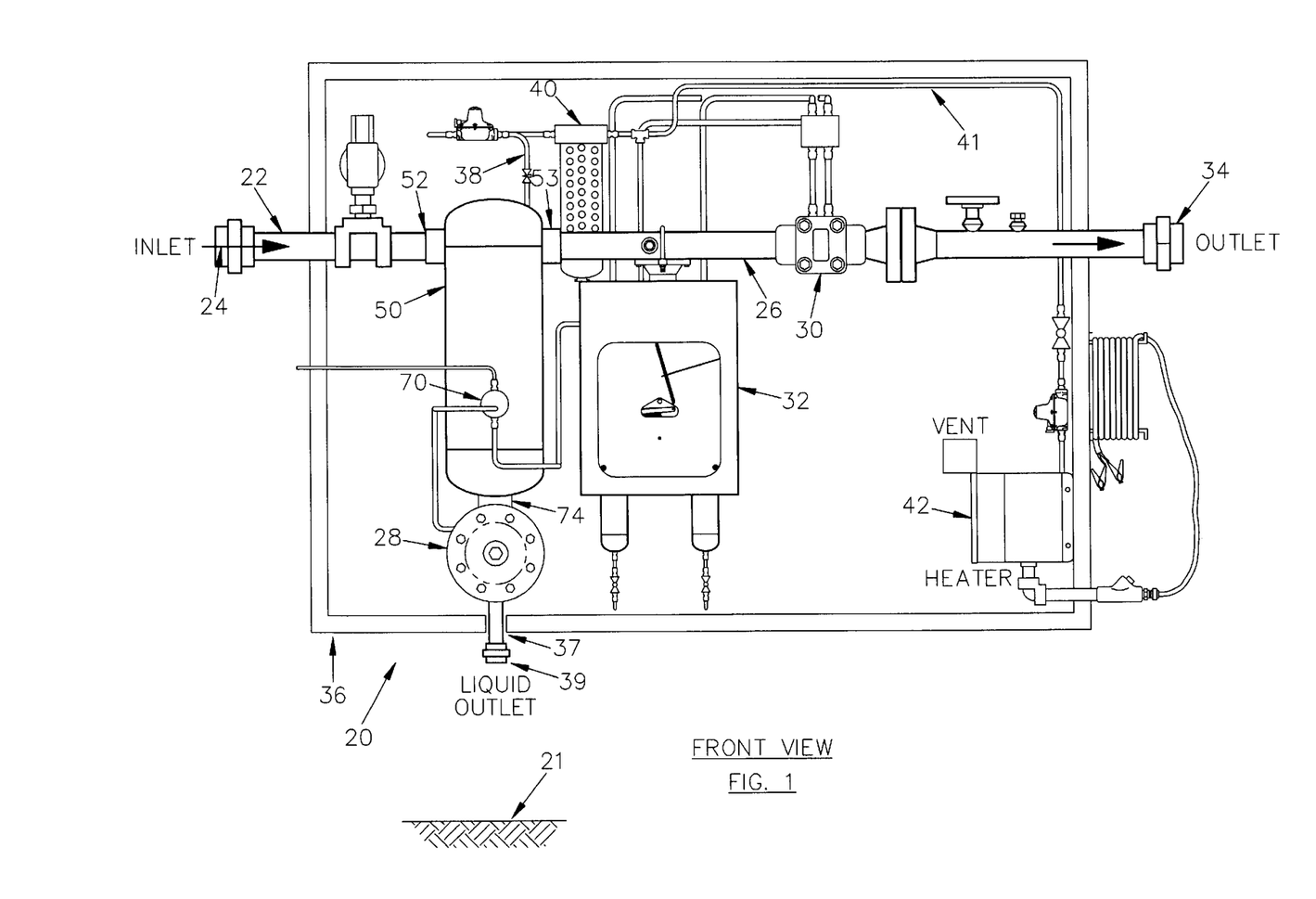
FIG. 1 is a elevated front view of a wellhead separation system in an enclosure with its cover removed according to the present invention.

The separation system of the present invention, generally designated by reference numeral 20 in FIG. 1, is connected on or directly adjacent to a gas wellhead via an inlet pipe 22. Gas, namely unprocessed natural gas or the like, from the wellhead enters the separation system through the inlet pipe 22 (typically 2 inches, or 50.8 mm, in diameter), as indicated by arrow 24. The inlet pipe 22 communicates with an inlet 52 of a separator, the first embodiment of which is generally designated by 50. It is understood that the gas entering the system 20 carries heavier liquids, primarily water which may also contain particulate matter as discussed earlier, and so will be referred to below as a gas/water mixture or gas stream.

Figure 2:
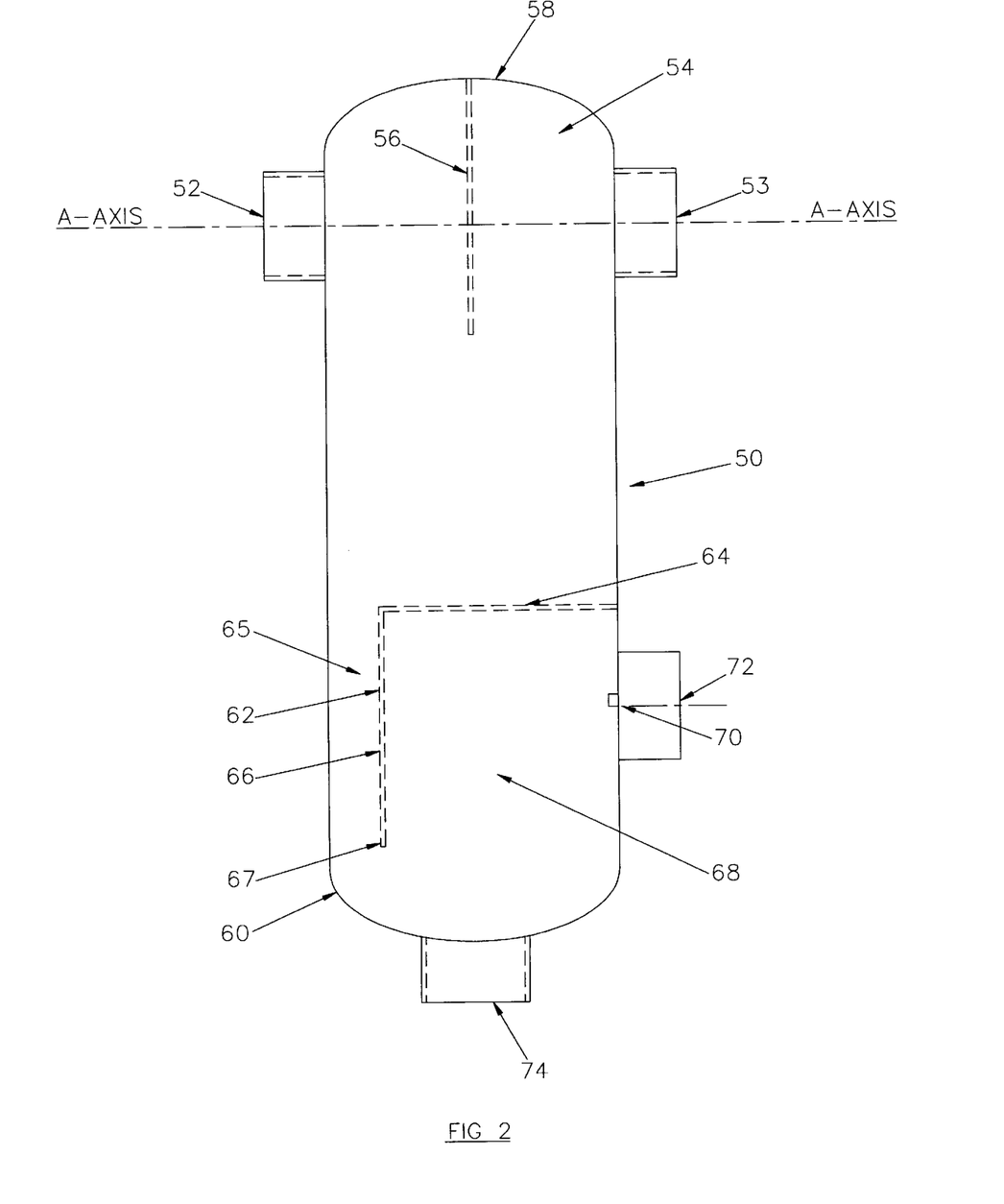
FIG. 2 is an enlarged, partially transparent rear view of a first embodiment of a separator of the present system.
Figure 3:
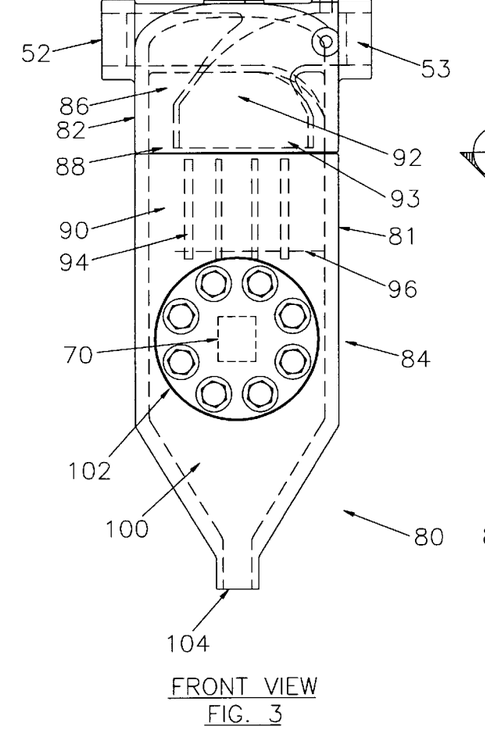
FIG. 3 is partially transparent front elevation view of a second embodiment of a separator of the present invention.
Figure 4:
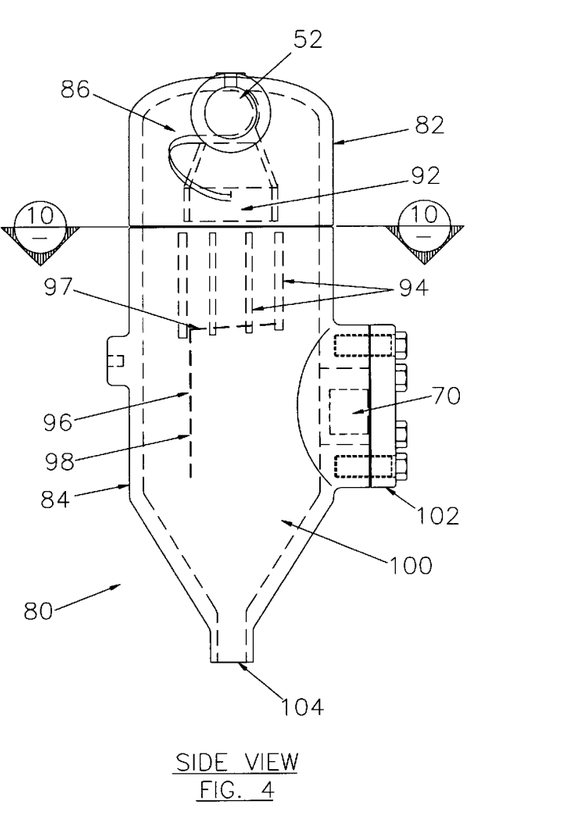
FIG. 4 is a transparent side view of the separator of FIG. 3.
Figure 5:
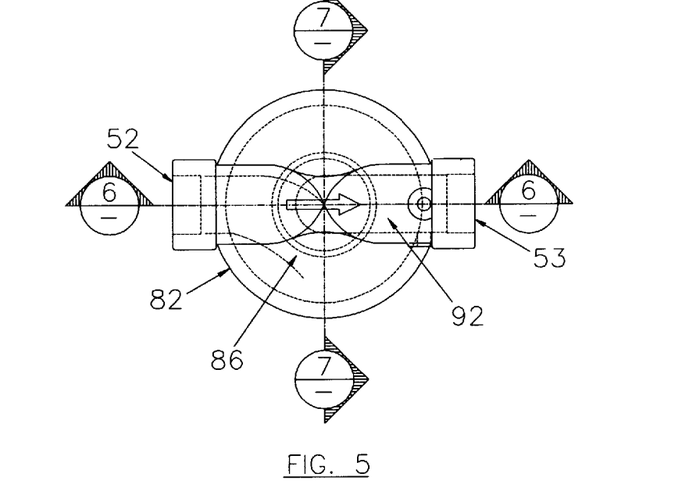
FIG. 5 is a partially transparent plan view of FIG. 3 showing the separator's head.
Figure 6:
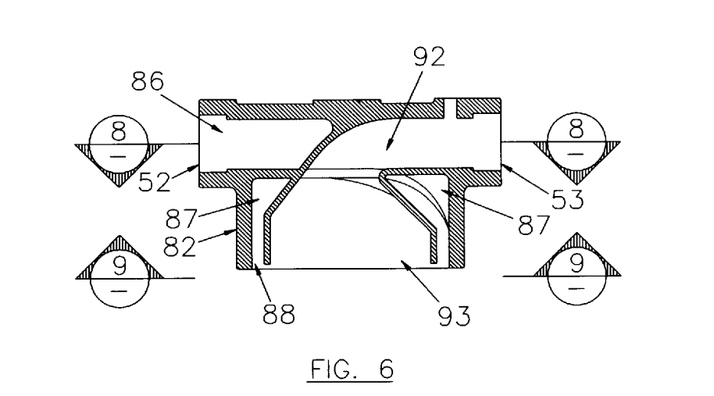
FIG. 6 is a cross-sectional side view along line 6—6 of FIG. 5.
Figure 7:
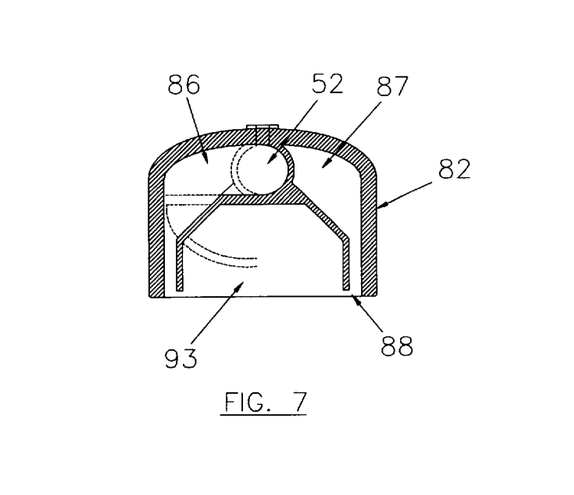
FIG. 7 is a cross-sectional side view along line 7—7 of FIG. 5.
Figure 8:
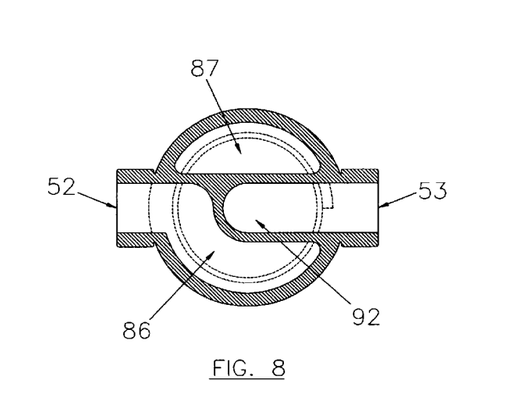
FIG. 8 is a cross-sectional plan view along line 8—8 of FIG. 6.
Figure 9:
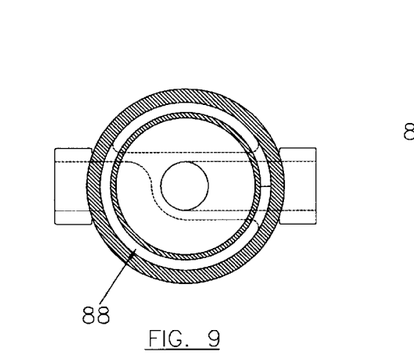
FIG. 9 is a view from below of the separator head along line 9—9 of FIG. 6.
Figure 10:
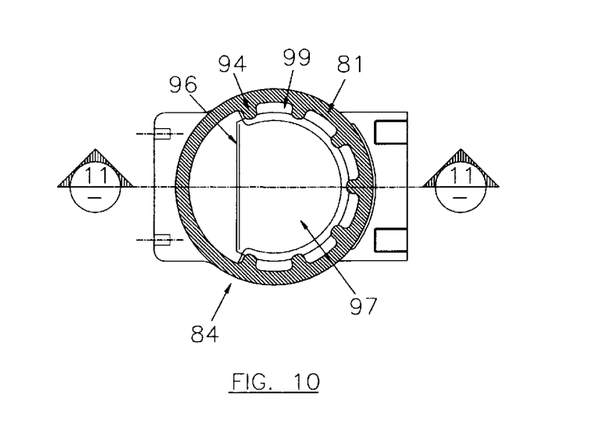
FIG. 10 is a cross-sectional plan view of the separator's lower body portion along line 10—10 of FIG. 4.
Figure 11:
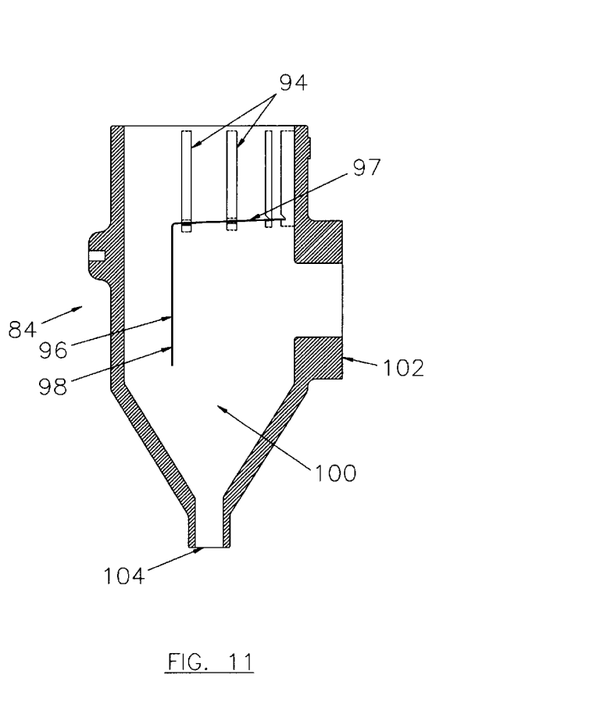
FIG. 11 is a cross-sectional side view along line 11—11 of FIG. 10.

Referring now to FIG. 2, the generally cylindrically shaped separator 50 according to a first embodiment is shown. It is noted that the separator 50 in FIG. 2 is a rear view of FIG. 1 in that the inlet 52, for example, shown on the left side of the separator in FIG. 1 is viewed on the right side of the separator in FIG. 2. The gas/water mixture entering through a generally tubular inlet 52 first encounters a change in velocity (i.e. speed) in a disengaging chamber 54 which is an enlargement in the inlet pipe 22. Most of the free liquid separates from the gas stream at this stage and falls to the bottom of the separator. The gas stream continues forward and strikes an impingement baffle 56 which forces the gas stream to change direction and coalesces any liquid remaining in the gas stream on the baffle. The baffle 56 is in the form of a substantially flat plate suspended vertically from a generally spherical dome portion 58 of the separator generally perpendicularly to the longitudinal axis "A" of the inlet 52, and preferably extends across the separator and below the inlet 52. The liquid which collects on the baffle 56 falls to the bottom of the separator by the force of gravity. The gas stream from which the liquid has separated, referred to herein as the dehydrated or "dried" gas stream, changes direction again as it makes its way around underneath the baffle 56 and exits the separator through it's generally tubular outlet 53, continuing down the system's outlet pipeline 26 free of any appreciable liquid. In this embodiment, as well as the second embodiment, the outlet shares a common longitudinal axis "A" with the inlet.

The liquid that has dropped out of the gas stream in the separator 50 collects at a bottom inverted dome-shaped portion 60 of the separator. The falling liquid is first directed to the bottom of the separator by a down comer 62 whose purpose is to force any heavy particles such as sand, dirt, or silt to the bottom of the liquid collected in the bottom portion 60 and away from a level switch mechanism 70 which may be adversely affected thereby. The down comer 62 has a generally horizontal portion 64 which first engages the falling liquid, and a generally vertical portion 66 which extends across the separator and forms an elbow with the horizontal portion. The horizontal portion also extends across the separator, except where the elbow forms a gap 65 with the separator's wall, and is gently sloped to urge the liquid toward the vertical portion. Requiring the liquid to travel down the vertical portion 66 forces or directs any sediment to the bottom 60 of the separator and away from the a float flange 72 which supports the level switch mechanism 70. Since sediment is heavier than liquid it will not rise to the top of a holding compartment 68 located above the bottom 60. The clean liquid (i.e. primarily water from which at least some sediment has settled out toward the bottom 60) makes its way up and around the lower edge 67 of the down comer where it rests in the holding compartment 68. This holding compartment gives the liquid therein further time for any remaining heavy particles to drop out of the liquid toward the bottom 60.

The collected liquid, including the sediment, is periodically drained from the bottom of the holding compartment 68 through fluid exit port 74 and is discharged out of the separator either onto the ground surface 21 below the separator or to other available means, such as a storage tank or sewer system. The level switch 70 (see FIG. 1) is attached to the float flange 72 to control the build-up and discharge of fluids in the separator. Once a certain liquid level is sensed in the holding compartment 68 by the level switch 70, a signal is sent to an external dump valve 28 attached to the fluid exit port 74 to open and dump liquids out of the separator.

The dried gas stream exiting the separator through the outlet 53 and pipeline 26 travels through a meter run 30 where the volume of passing gas is measured on a chart recorder 32, which gas then exits the system at 34 to a gas collection/distribution network. The entire separator system 20 is housed within a heated insulated enclosure 36, which is in the form of a metal box having a hinged access door, removable panel or the like, for exposing the system as shown in FIG. 1. Fuel gas is supplied from the top of the separator through a gas line 38 and is dried in a fuel gas dryer 40, which dried fuel is then delivered through conduit 41 to a heater unit 42 and burned to heat the enclosure 36 and prevent freeze-up of the system in cold conditions. The enclosure 36 is elevated above the ground surface 21 and is fully supported on the inlet pipe 22 and the outlet pipe 26. The bottom of the enclosure has an opening 37 beneath the separator through which liquid dumped from the valve 28 travels via a liquid outlet pipe 39 to reach the ground surface or other collection means such as a tank or the like.

A second embodiment of the separator indicated by 80 is shown in FIGS. 3–11. For each of the embodiments disclosed herein the same reference numerals are used for the same or substantially similar components. The separator 80 is substantially identically located in the system 20 as separator 50 in FIG. 1, communicating with the system through inlet 52 and outlet 53. The separator is formed of two main components, namely an upper dome-like head portion 82 fixed atop a generally cylindrical lower body portion 84.

The gas/water mixture entering through the inlet 52 is first forced to change direction and rotates in a centrifugal motion, spiraling down through a reversed funnel chamber 86 located generally along the inside periphery of the head portion 82. The funnel chamber has a top end which matches the circular cross-section of the inlet 52, and a bottom terminal end 88 which forms a narrow slit extending circumferentially about the head portion. The opening of the terminal end is of about the same cross-sectional area as that of the inlet. A middle spiral portion 87 of the funnel chamber forms a relatively larger open space intermediate the top and bottom ends, namely the cross-sectional area of the middle portion is larger than that of the ends of the funnel chamber ends. Hence, as the gas stream enters the middle portion 87 from the inlet its velocity changes (ie. decelerates) due to the larger open area, and is urged to swirl and spin due to the shape of the middle portion. As the gas stream travels downwardly to the terminal end 88 the mixture experiences another change in velocity (ie. acceleration) due to the constriction in the chamber's terminal configuration. The spiraling action and changes in velocity urge the liquid of the gas stream to separate out from the gas.

Upon leaving the reversed funnel chamber at 88 the gas stream enters a larger disengaging chamber 90 where the gas stream again decelerates. The gas stream travels along the separator's outer wall 81 in a spinning, circular motion until it collides with a series of vertically oriented, horizontally spaced baffles or ribs 94 which protrude inwardly from the separator's wall 81 in the disengaging chamber 90. Such collision forces a good portion of the liquid to coalesce and run down the ribs 94 toward the bottom of the separator. In the present embodiment the stream leaving the funnel chamber spins in a counterclockwise direction when viewed in FIG. 10. Such direction is a matter of choice and may be made clockwise by reversing the orientation of the funnel chamber.

As the heavier liquid particles are drawn out and travel toward the bottom of the separator, the lighter dried gas stream changes direction enters or is drawn into an acceleration chamber 92. The acceleration chamber is in the form of a funnel which decreases in cross-section area from its open mouth 93 above the disengaging chamber 90 to its terminal end at the outlet 53. The outer periphery of the acceleration chamber 92 forms a substantial portion of the inner periphery of the funnel chamber 86. The acceleration chamber's funnel shape forces the dried gas stream to accelerate and change direction as it moves through the chamber 92, urging any liquid left in the exiting gas to precipitate out and fall toward the bottom of the separator. The lighter dried gas stream therefore proceeds up the acceleration chamber and exits the gas outlet 53 into pipeline 26.

The liquid traveling down the ribs 94 and falling from the acceleration chamber 92 contacts a down comer 96 which functions in substantially the same manner as the down comer 62 of the first embodiment. The semi-circular, generally horizontal top portion 97 engages the ribs at a bottom end thereof (see FIGS. 4, 10 and 11) and is gently sloped toward the vertical side portion 98 which deposits the liquid in a funnel shaped bottom sump 100. A circumferential shelf 99 directs the liquid from the ribs onto the down comer's top portion to prevent the liquid from by-passing the down comer. The level switch 70 attached to a float flange 102 controls the build-up of liquid in the separator's sump. Once a pre-set liquid level is sensed by the level switch, a signal is sent to the external dump valve 28 attached a fluid exit port 104 at the bottom of the sump 100. The valve 28 then opens to dump all liquids from the separator.

The separator system of the present invention is preferably, but not exclusively, used on gas wells that are at the end of their economic life or on wells that produce relatively low volumes of gas. Good results have been achieved on gas wells with low flow rates. The separator of the present invention has performed well for design pressures of between 700 psig and 1480 psig at 100° F., depending on separator size and embodiment.

Some of the advantages of the present system may now be better appreciated, namely:

the system has a compact design;

is light weight relative to prior separator designs;

is simple to operate and easy to maintain due to very few moving parts;

may be constructed from commercially available pipe fittings;

is inexpensive to produce and install; and, the system design can be easily adapted to ASME, CSA and API codes.

The separator of the present invention is designed based on the view that the gas from the wellhead requires more space for liquid collection than space for liquid separation. Unlike prior separator systems, the present separator combines multiple changes in gas stream direction and velocity, as well as centrifugal force (in the second embodiment), to achieve efficient separation of liquids from the gas stream in a compact space. Hence, the system and enclosure therefor is itself compact and lightweight so that it may be advantageously located near the wellhead and elevated above ground level without the need for any special supports, which is particularly suitable in cold climates.

The above description is intended in an illustrative rather than a restrictive sense and variations to the specific configurations described may be apparent to skilled persons in adapting the present invention to specific applications. Such variations are intended to form part of the present invention insofar as they are within the spirit and scope of the claims below.

I claim:

1. A compact system for removing liquid from a gas stream exiting a natural gas wellhead, said system comprising:

an inlet pipe string communicating with said wellhead for delivering said gas stream therefrom;

an elongate, generally cylindrical gas-liquid separator having an inlet communicating with said inlet pipe string for receiving said gas stream therein, said separator being adapted to separate said liquid from said gas stream to provide a dried gas stream and to store a pre-set volume of said liquid therein, and an outlet for releasing said dried gas stream;

an outlet pipe string communicating with said outlet of the separator for transporting said dried gas stream away from said separator; and, an enclosure for housing said separator and at least a portion of said inlet and outlet pipe strings, said enclosure being elevated above a ground surface and supported on said inlet and outlet pipe strings, and having an opening therein for permitting said liquid to exit said separator and enclosure.

2. The system of claim 1 wherein said enclosure is temperature insulated and further includes a heater for heating said enclosure.

3. The system of claim 1 further including a fuel gas dryer having an intake from said separator for diverting a portion of said gas stream, a dryer body for drying said portion of gas stream, and an outlet for delivering said dried portion of gas stream to said heater for use in heating said enclosure.

4. The system of claim 1 further including a metering device within said enclosure communicating with said outlet pipe string for measuring the volume of said dried gas flowing therethrough, and a chart recorder within said enclosure communicating with said metering device for recording the measured volume of dried gas.

5. The system of claim 1 wherein said separator includes a disengaging chamber in fluid communication with said inlet for changing the velocity of said gas stream, and at least one baffle element in said disengaging chamber for engaging said gas stream to urge said liquid to coalesce thereon and fall by gravity toward one end of the separator.

6. The system of claim 5 wherein said baffle element comprises a plate member located on one side of said disengaging chamber across from said inlet, and is oriented generally perpendicularly to a longitudinal axis of said inlet.

7. The system of claim 6 wherein said outlet is located along said longitudinal axis of the inlet, and said plate member is located in between said inlet and outlet to force said gas stream entering through said inlet to change direction and to travel around said plate member before exiting through said outlet.

8. The system of claim 5 wherein said separator further includes a funnel chamber communicating with said inlet for imparting a centrifugal motion, a change in direction and at least one change in velocity to said gas stream prior to said gas stream entering said disengaging chamber.

9. The system of claim 8 wherein a middle portion of said funnel chamber has a larger cross-section area than said inlet to the funnel chamber to decelerate the gas stream flowing thereto from said inlet.

10. The system of claim 9 wherein a terminal second end of said funnel chamber opposite said inlet forms a narrow slit extending circumferentially about at least a portion of said separator, said second end having a smaller cross-section area than said middle portion to accelerate the gas stream flowing therethrough from said middle portion.

11. The system of claim 8 wherein said separator further comprises an acceleration chamber for channeling said dried gas stream from said disengaging chamber to said outlet, said acceleration chamber including a means for accelerating said dried gas stream toward said outlet.

12. The system of claim 8 wherein said at least one baffle element comprises a plurality of ribs for engaging said gas stream exiting said funnel chamber, said ribs being arranged in a spaced, parallel relationship about a portion of a periphery of said disengaging chamber.

13. The system of claim 5 wherein said separator further includes a down comer element for engaging said falling liquid from said at least one baffle member.

14. The system of claim 13 wherein said down comer comprises a generally horizontal portion for intercepting said falling liquid, and a generally vertical portion extending therefrom for directing sediment in said intercepted liquid to the bottom of said end of the separator.

15. An apparatus for separating liquid from a gas stream to provide a dried gas stream for a natural gas pipeline wherein an inlet pipe string communicates with a natural gas well for transporting said gas stream therefrom, said apparatus comprising:

an elongate, generally cylindrical body having an inlet communicating with said inlet pipe string for receiving said gas stream, a disengaging chamber in fluid communication with said inlet for changing the velocity of said gas stream, at least one baffle element in said disengaging chamber for engaging said gas stream to urge said liquid to coalesce thereon and fall by gravity toward one end of the body to provide said dried gas stream, an outlet in communication with said disengaging chamber for releasing said dried gas stream from said body to said natural gas pipeline;

wherein said body further includes a down comer element for engaging said falling liquid from said at least one baffle member.

16. The apparatus of claim 15 wherein said baffle element comprises a plate member located on one side of said disengaging chamber across from said inlet, and is oriented generally perpendicularly to a longitudinal axis of said inlet.

17. The apparatus of claim 16 wherein said outlet is located along said longitudinal axis of the inlet, and said plate member is located in between said inlet and outlet to force said gas stream entering through said inlet to travel around said plate member before exiting through said outlet.

18. The apparatus of claim 15 wherein said down comer comprises a generally horizontal portion for intercepting said falling liquid, and a generally vertical portion extending therefrom for directing sediment in said intercepted liquid to the bottom of said end of the body.

19. The apparatus of claim 18 wherein a bottom edge of said vertical portion of the down comer is spaced above said bottom of the body.

20. The apparatus of claim 18 wherein said body further includes a tapered fluid exit port at said bottom of the body for discharging said sediment and liquid stored therein.

21. An apparatus for separating liquid from a gas stream to provide a dried gas stream for a natural gas pipeline wherein an inlet pipe string communicates with a natural gas well for transporting said gas stream therefrom, said apparatus comprising:

an elongate, generally cylindrical body having an inlet communicating with said inlet pipe string for receiving said gas stream, a disengaging chamber in fluid communication with said inlet for changing the velocity of said gas stream, at least one baffle element in said disengaging chamber for engaging said gas stream to urge said liquid to coalesce thereon and fall by gravity toward one end of the body to provide said dried gas stream, an outlet in communication with said disengaging chamber for releasing said dried gas stream from said body to said natural gas pipeline;

wherein said body further includes a funnel chamber communicating with said inlet for imparting a centrifugal motion to said gas stream prior to said gas stream entering said disengaging chamber.

22. The apparatus of claim 21 wherein said funnel chamber includes means for varying the velocity of said gas stream to urge said liquid from said gas stream.

23. The apparatus of claim 22 wherein a first end of said funnel chamber matches the configuration of said inlet and an opposed second end of said funnel chamber forms a narrow slit extending circumferentially about at least a portion of said body, and said means for varying the velocity comprises a middle funnel portion intermediate said first and second ends having a larger cross-sectional opening than that of said first and second ends.

24. The apparatus of claim 21 wherein said body further comprises an acceleration chamber for channeling said dried gas stream from said disengaging chamber to said outlet, said acceleration chamber including a means for accelerating said dried gas stream toward said outlet.

25. The apparatus of claim 24 wherein said means for accelerating comprises a first end of said acceleration chamber open to said disengaging chamber having a larger cross-section area than a second end of said acceleration chamber adjacent said outlet.

26. The apparatus of claim 21 wherein said at least one baffle element comprises a plurality of ribs for engaging said gas stream exiting said funnel chamber, said ribs being arranged in a spaced, parallel relationship about a portion of a periphery of said disengaging chamber.

27. The apparatus of claim 26 wherein said body further includes a down comer element for engaging said falling liquid from said at least one baffle member.

28. The apparatus of claim 27 wherein said down comer comprises a generally horizontal portion for intercepting said falling liquid, and a generally vertical portion extending therefrom for directing sediment in said intercepted liquid to the bottom of said end of the body.

29. The apparatus of claim 28 wherein a bottom edge of said vertical portion of the down comer is spaced above said bottom of the body.

30. The apparatus of claim 29 wherein said horizontal portion of the down comer intercepts said ribs generally opposite said funnel chamber.

* * * * *